United States Patent
Black et al.

[15] 3,667,340
[45] June 6, 1972

[54] FASTENING DEVICE AND METHOD OF MAKING SAME

[72] Inventors: Daniel A. Black, Pittsburgh, Pa.; Albert A. Ingersoll, Santa Ana; Ira Bill Lee York, Costa Mesa; David O. Jones, Tustin, all of Calif.

[73] Assignee: Textron Inc.

[22] Filed: Apr. 29, 1970

[21] Appl. No.: 32,970

[52] U.S. Cl. .................................................. 85/71
[51] Int. Cl. ......................................... F16b 13/04
[58] Field of Search .............................. 85/71, 70

[56] References Cited

UNITED STATES PATENTS

| | | | |
|---|---|---|---|
| 2,148,977 | 2/1939 | Buck | 85/71 |
| 3,230,818 | 1/1966 | Siebol | 85/71 |
| 2,257,538 | 9/1941 | Schlueter | 85/70 |
| 2,324,142 | 7/1943 | Eklund | 85/70 |
| 2,277,885 | 3/1942 | Rodanet | 85/70 |
| 1,349,977 | 8/1920 | Mulkern | 85/71 |
| 2,341,598 | 2/1944 | Crowley | 85/71 |

Primary Examiner—Edward C. Allen
Attorney—George B. White

[57] ABSTRACT

The fastening device is in the nature of a rivet wherein a tubular sleeve has a head on one end bearing against one side of the work, and an internally threaded tail. A screw extended through the head and sleeve is threaded into said tail, and is so positioned that the screw head is initially spaced from the head of the sleeve; the shank of the sleeve is slotted and the resulting strips are notched internally at about the middle so that by turning the screw the tail travels toward the head and the strips are folded flat against the other face of the work. In the method of making this fastener, after the hollow rivet with the head is formed, it is positioned in a die, and cutting blades are forced through the wall of the sleeve to cut parallel longitudinal slots dividing the middle portion of the sleeve into strips of arcuate cross section; then the sleeve is held in a die while a tool is inserted and rotated to cut a groove into the strips for facilitating the collapsing of the sleeve; then the screw is inserted into the sleeve and the tail of the sleeve is pressed or swaged into the screw to form the internal thread in the tail and hold the screw. The shank between the sleeve head and the adjacent ends of the slots is approximately equal to the minimum thickness in which the fastener is used. The sleeve head has a recess in both faces to accommodate suitable washers.

1 Claims, 18 Drawing Figures

PATENTED JUN 6 1972 3,667,340
SHEET 1 OF 2
Fig. 1.
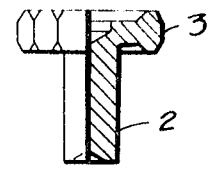
Fig. 2.
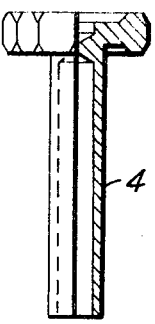
Fig. 3.
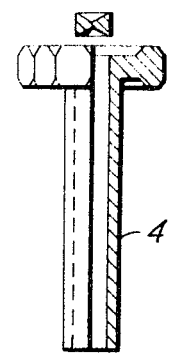
Fig. 4.
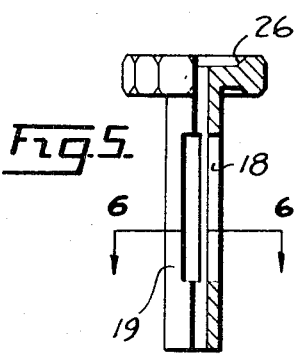
Fig. 5.
Fig. 6.
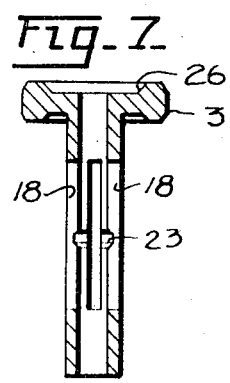
Fig. 7.
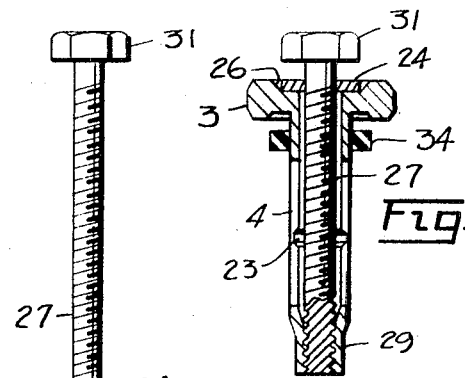
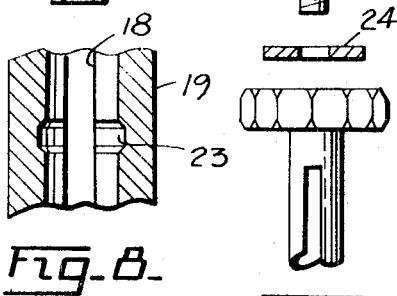
Fig. 8.
Fig. 9.
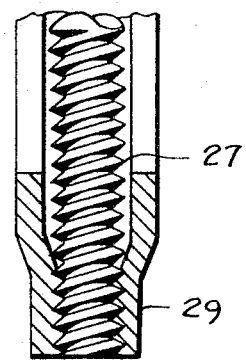
Fig. 11.
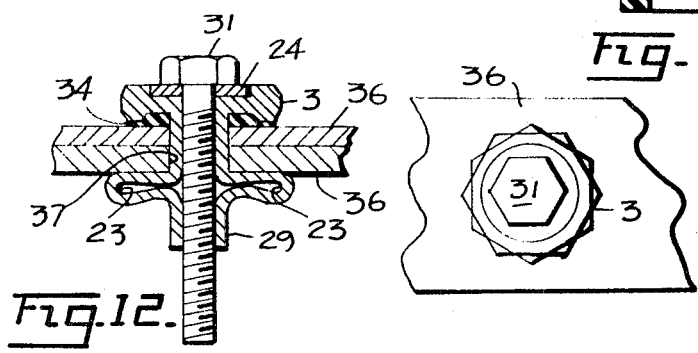
Fig. 12.
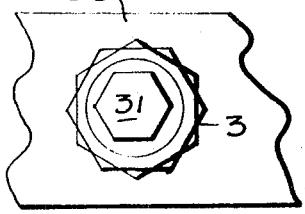
Fig. 13.
INVENTORS
DANIEL A. BLACK
ALBERT A. INGERSOLL
IRA BILL LEE YORK
DAVID O. JONES
BY George V. White
ATTORNEY

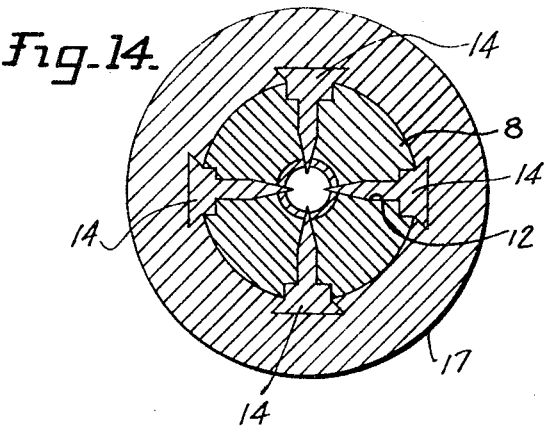
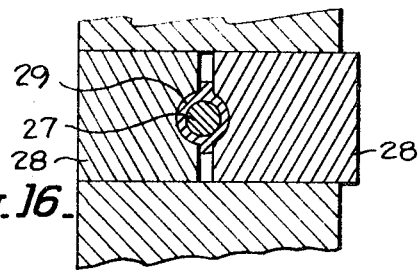
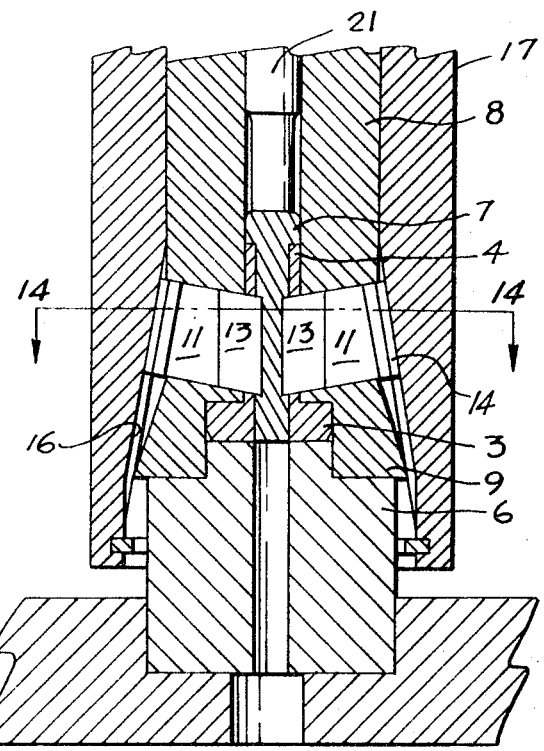
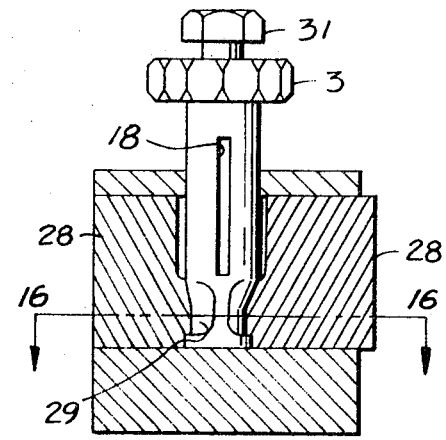
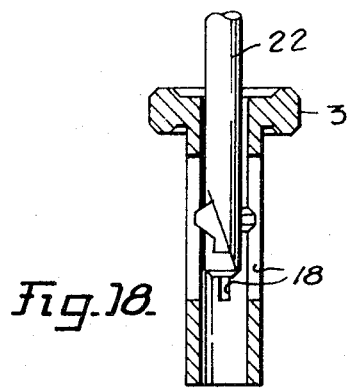
INVENTORS
DANIEL A. BLACK
ALBERT A. INGERSOLL
IRA BILL LEE YORK
DAVID O. JONES
BY George B. White
ATTORNEY 3,667,340

FASTENING DEVICE AND METHOD OF MAKING SAME

BACKGROUND OF THE INVENTION

So-called anchor bolts are well known in the art, as represented for instance in U.S. Pat. No. 2,236,079 of Wipper, granted Mar. 25, 1941; or U.S. Pat. No. 2,559,281 of Croessant, dated July 3, 1951; or U.S. Pat. No. 2,913,953 of Tendler, dated Nov. 24, 1959; wherein by turning a screw the tail of is pulled toward the inside face of the work thereby collapsing a slotted middle portion of the sleeve outwardly and against the inner face of the work.

Several of the problems in connection with the prior art anchor bolts are that they are structurally complex and expensive, the screws frequently bind in the tail in the initial position, and the screw head works tightly frictionally against the sleeve head, and they are not leak proof.

Some of the advantages of the fastening device and method herein are as follows: the fastener is leak proof; it allows light clamping of the sheets together, the initial torque being minimal and is then increased; the tail of the sleeve is formed without fracturing; galling effect between the screw head and sleeve head is minimized, the expanded sleeve can be consistently flattened against the blind face of the work to accomplish complete clinching thereby firmly to hold the structures together.

BRIEF DESCRIPTION OF THE DRAWINGS

FIG. 1 is a partly sectional view of the bar or wire from which the hollow sleeve is formed.

FIG. 2 shows partly in section the formed head on the shank.

FIG. 3 shows the extrusion of the shank into a tubular sleeve.

FIG. 4 shows the knocking out of the plug from the sleeve head.

FIG. 5 shows the slots formed on the sleeve.

FIG. 6 is a partly sectional view taken on lines 6—6 of FIG. 5.

FIG. 7 is a partly sectional view showing the notches cut into the strips between the longitudinal slots.

FIG. 8 is a fragmental sectional view showing the notches on an enlarged scale.

FIG. 9 is a developed view of the parts of the fastener assembly, some parts in section.

FIG. 10 is a sectional view of the fastener parts assembled.

FIG. 11 is a sectional enlarged view of the tail of the fastener.

FIG. 12 is a sectional view of the fastener set in the work.

FIG. 13 is a plan view of the fastener in the work.

FIG. 14 is a cross-sectional view, the section being taken on lines 14—14 of FIG. 15.

FIG. 15 is a sectional view of the device for cutting the slots in the sleeve.

FIG. 16 is a cross-sectional view on lines 16—16 of FIG. 17.

FIG. 17 is a sectional view of the swaging die applied to the tail of the fastener.

FIG. 18 shows the notch cutter in the sleeve.

DETAILED DESCRIPTION

The hollow sleeve of the fastener is made by forming a bar or wire 1 into a shank 2 with a head 3 of polygonal circumference, as shown in FIGS. 1 and 2, and then elongating the shank into a tubular sleeve 4 as shown in FIG. 3.

The tubular sleeve 4 is placed on an anvil 6, as shown in FIG. 15, so that the sleeve head 3 rests on the anvil 6. A mandrel 7 is positioned in the sleeve 4 and the sleeve 4 is held in a guide 8 which is lowered over the sleeve 4, as shown in FIG. 15 so that the guide 8 rests on a shoulder 9 below the top face of the anvil 6. A plurality of cutting blades 11 are slideable in slots 12 in the guide 9 with their cutting edges 13 toward the sleeve 4. Each blade 11 has a dovetail head 14 slideable in a dovetail groove 16 in a ram 17, which latter is slideable over the guide 8. The dovetail grooves 16 are inclined to converge away from the anvil 6 so that when the ram 17 is moved downwardly relatively to the guide 8, the dovetail grooves 16 move the blades 11 radially inwardly to cut longitudinal slots 18 into the hollow sleeve 4, thereby to form expansion strips 19 between the slots 18, as shown in FIGS. 5 and 6. When the ram 17 is moved upwardly relatively to the guide 8 the dovetail grooves 16 move the blades 11 radially outwardly to withdraw them from the sleeve slots 18.

As the guide 8 is lifted, a pin 21 knocks the mandrel 7 and the hollow sleeve 4 out of the holder guide 8.

Then a notching tool 22 is inserted into the sleeve and is suitably rotated to cut a notch in the inside face of each expanding strip 19, as shown in FIGS. 7 and 8. Then a washer 24 is placed in a top recess 26 of the sleeve head 3 and a screw 27 is inserted through the washer 24, sleeve head 3 and sleeve 4. The end of this assembly is placed between die sections 28 as shown in FIGS. 16 and 17 which crimp the metal in the tail end 29 so as to form around the tail end of the screw thus forming internal threads in the tail 29 of the hollow sleeve 4. Prior to this operation the threads of the screw in the hollow sleeve 4 are treated with a suitable lubricant to prevent galling between the swaged or formed materials in the screw tail and the sleeve tail. In this forming operation the material of the sleeve tail 29 is work-hardened increasing the strength of the formed threads above that which might be obtained by making these sleeve threads with a tapping or cutting operation. The screw 27 is substantially longer than the total length of the sleeve head 3 and the sleeve 4 so that as the sleeve tail 29 is crimped or swaged over the tail end of the screw 27 the screw head 31 is spaced from the sleeve head 3 as shown in FIG. 17, permitting initial turning of the screw to the distance of said head spacing before the torque is applied for expanding the strips 19.

In practice the sleeve is made of sufficiently ductile material to form without fracturing and the screw is made of mild steel capable of developing the torque for installation.

The resulting assembly is a headed hollow sleeve 4 with expanding strips 19 between longitudinal slots 18 spaced from the threaded sleeve tail 29 and from the sleeve head 3. The strips 19 have internal notches 23 spaced closer to the ends of the sleeve slots 18 nearer the sleeve head 3. The washer 24 in the top recess 32 of the sleeve head 3 prevents galling and binding between the sleeve head 3 and the screw head 31. The bottom recess accommodates an expandable sealing washer 34 which is expanded and tightly pressed between the sleeve head 3 and the outer face of the structure such as the sheet 36, as shown in FIG. 12.

In operation the blind fastener assembly is inserted through the holes 37 in the sheets 36, then while the sleeve head 3 is held against rotation and against the outer face of the adjacent sheet 36, the turning force or torque is initially applied to the screw head 31 until the screw head 31 is brought against the top washer 24 and bears against the sleeve head 3. Further setting torque is then applied for turning the screw so that the sleeve tail 29 is pulled on the screw 27 toward the blind side of the adjacent sheet 36 whereby the strips 19 are forced to bow outwardly at the notches 23 and collapsed tightly against the blind side of the work, as shown in FIG. 12. Thus initial light clamping is allowed, followed by higher setting torque.

I claim:

1. In a leakproof anchor fastener including,
   a hollow sleeve,
   a head on an end of the sleeve,
   an internally threaded tail on said hollow sleeve,
   said sleeve having longitudinal slots thereon between said head and tail to form outwardly expandable and foldable fastening strips,
   a screw extended through said head and sleeve and being threaded into said tail,
   the improvement of
   a head on said screw initially spaced from the head of the sleeve to facilitate the turning of the screw prior to the expanding of the sleeve thereby to prevent binding between said threaded tail and said screw, a washer on a face of said sleeve head adjacent said screw head, a sealing washer on the other face of said sleeve head for sealing said sleeve head when said anchor bolt is set, means to guide the folding of said strips of slotted sleeve portion outwardly whereby, after said screw head bears against said sleeve head, said tail travels on the screw toward said sleeve head for folding and substantially flattening said strips against a work between said sleeve head and said strips, a rigid shank between said sleeve head and said slotted sleeve portion, said shank being shorter than the minimum thickness of the work to be clinched between said sleeve head and the expanded slotted portion, thereby to cause the flattening of the expanded slotted portion against said work, said sleeve head having flat portions on its periphery for engagement by a tool for holding said sleeve head against rotation during the turning of the screw, said sleeve head having a recess on each face thereof for the respective washers, said guiding means being an internal notch grooved into the inner periphery of said slotted sleeve portion spaced from said sleeve head, thereby to cause the collapsing of the strips outwardly and toward said sleeve head when said tail of said sleeve is pulled toward said sleeve head, said notch being offset from the middle of each slot toward the end of the slot nearer to the sleeve head so that the collapsed strips fold snugly and substantially flat against the work.

* * * * *